US005335407A

United States Patent [19]

Verkerk

[11] Patent Number: 5,335,407

[45] Date of Patent: Aug. 9, 1994

[54] METHOD AND APPARATUS FOR REMOVING ANTENNA BEARINGS

[75] Inventor: Neil H. Verkerk, Santa Clarita, Calif.

[73] Assignee: Datron Systems, Inc., Simi Valley, Calif.

[21] Appl. No.: 24,403

[22] Filed: Mar. 1, 1993

[51] Int. Cl.⁵ ........................ B23P 19/00; B23P 19/04; B66F 3/00; B25B 27/14

[52] U.S. Cl. .................................. 29/426.3; 29/426.1; 29/244; 29/281.5; 29/283; 254/134

[58] Field of Search ........... 29/898.01, 402.03, 402.08, 29/426.1, 426.3, 244, 264, 281.5, 283; 254/134, DIG. 16; 269/17

[56] References Cited

U.S. PATENT DOCUMENTS

| | | | |
|---|---|---|---|
| 2,213,766 | 9/1940 | Johnson | 269/17 |
| 4,027,365 | 6/1977 | Froeliger | 29/426.3 |
| 4,239,196 | 12/1980 | Hanger | 269/17 |
| 4,674,168 | 6/1987 | Bittner | 29/402.08 |

*Primary Examiner*—Mark Rosenbaum
*Assistant Examiner*—David P. Bryant
*Attorney, Agent, or Firm*—Edward A. Sokolski

[57] ABSTRACT

A support hinge is installed between the elevation and azimuth housings of the antenna pedestal. A jack is installed between these same housings at a location opposite to that at which the hinge is located. The elevation housing is then raised by means of the jack so that it pivotally moves upwardly on the hinge. A winch is installed on the support hinge so that it is capable of lateral pivotal motion. A bearing adapter having a plurality of arms extending therefrom is suspended from the winch and lowered until it is in contact with the bearing. Bolts are then used to join each of the arms to a threaded portion of the bearing. The bearing is then lifted out of the azimuth housing, swung pivotally away from such housing and lowered from the antenna pedestal. A new bearing is installed by reversing the above indicated procedure.

7 Claims, 2 Drawing Sheets

METHOD AND APPARATUS FOR REMOVING ANTENNA BEARINGS

BACKGROUND OF THE INVENTION

1. Field of the Invention

This invention relates to satellite and radar antennas and more particularly to a method and apparatus for facilitating the removal and replacement of the bearings of such antennas in the field.

2. Description of the Related Art

The removal and replacement of the bearings of large satellite and radar antennas in the field poses a difficult prodiem in that such antennas are often mounted on towers in positions difficult to access and work in. In the past such replacement has generally been accomplished by removing the entire antenna from its pedestal by means of a crane and making the necessary replacement with the antenna on the ground. This is a time consuming and expensive operation. The method and apparatus of the present invention obviates the need for removal of the antenna to replace the bearings thereof and enables such removal and replacement in situ.

BRIEF SUMMARY OF THE INVENTION

The azimuth bearing for a satellite or radar antenna is removed and replaced in situ by the following procedure. First a support hinge is installed between the elevation and azimuth housings of the antenna pedestal. A jack is then installed between these same housings but on the side thereof opposite to that on which the hinge is installed. The jack is then employed to tilt one side of the elevation housing up from the azimuth housing on the hinge high enough to permit access to the antenna azimuth bearing. A winch is installed on an arm attached to the hinge for lateral pivotal motion relative thereto, this winch having a bearing adapter suspended therefrom. The bearing adapter is lowered down onto the azimuth bearing and attached thereto by means of bolts which threadable engage a threaded portion of the bearing. The bearing having been loosened from its mounts is then lifted out of the azimuth housing by means of the winch, pivotally swung away from the housing and lowered below such housing. A new bearing is then installed by reversing this procedure.

DETAILED DESCRIPTION OF THE INVENTION

Figures 1, 2:
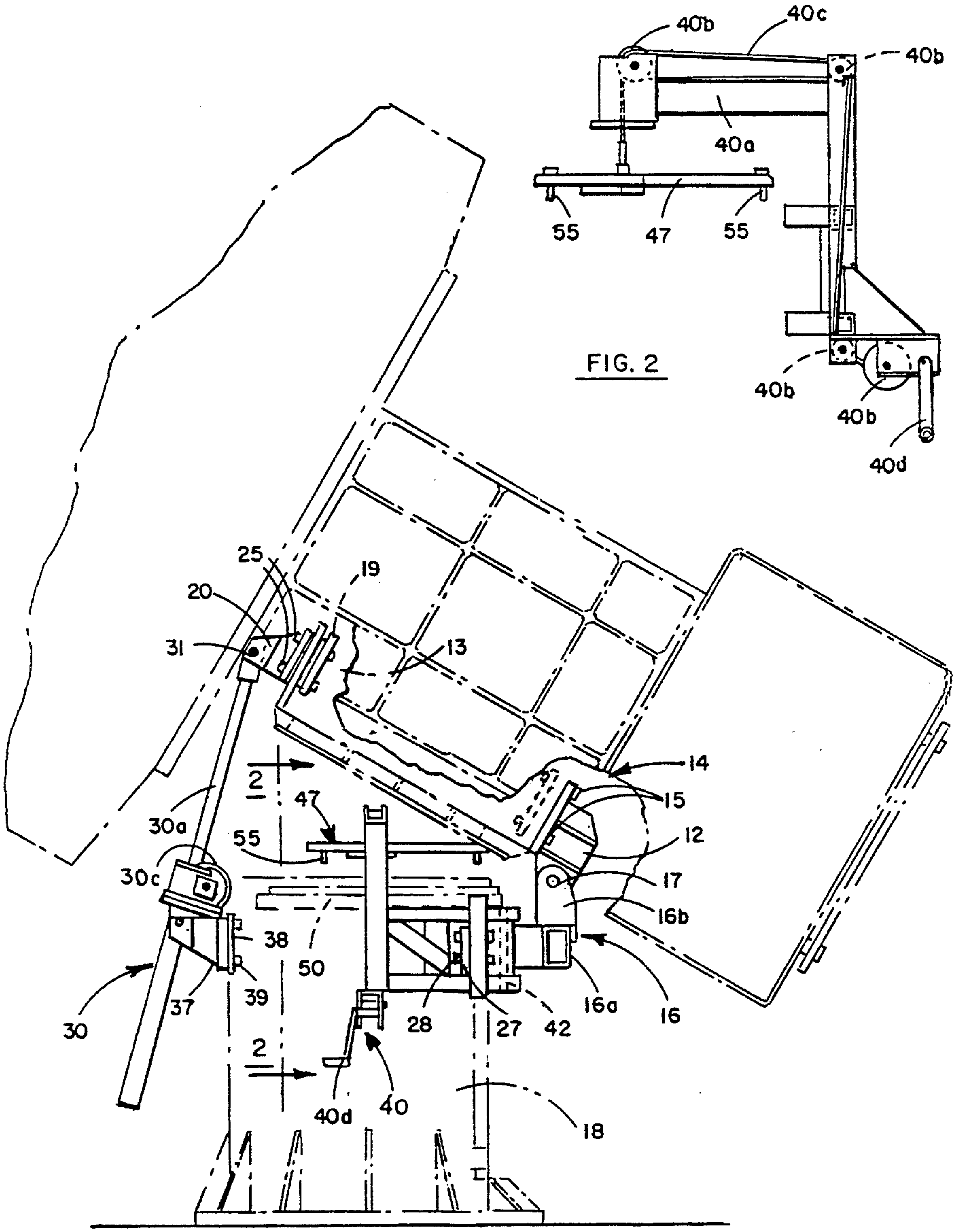
FIG. 1 is a side elevational view illustrating a preferred embodiment of the method and apparatus of the invention.
FIG. 2 is a view taken along the plane indicated by 2—2 in FIG. 1.
Figure 4:
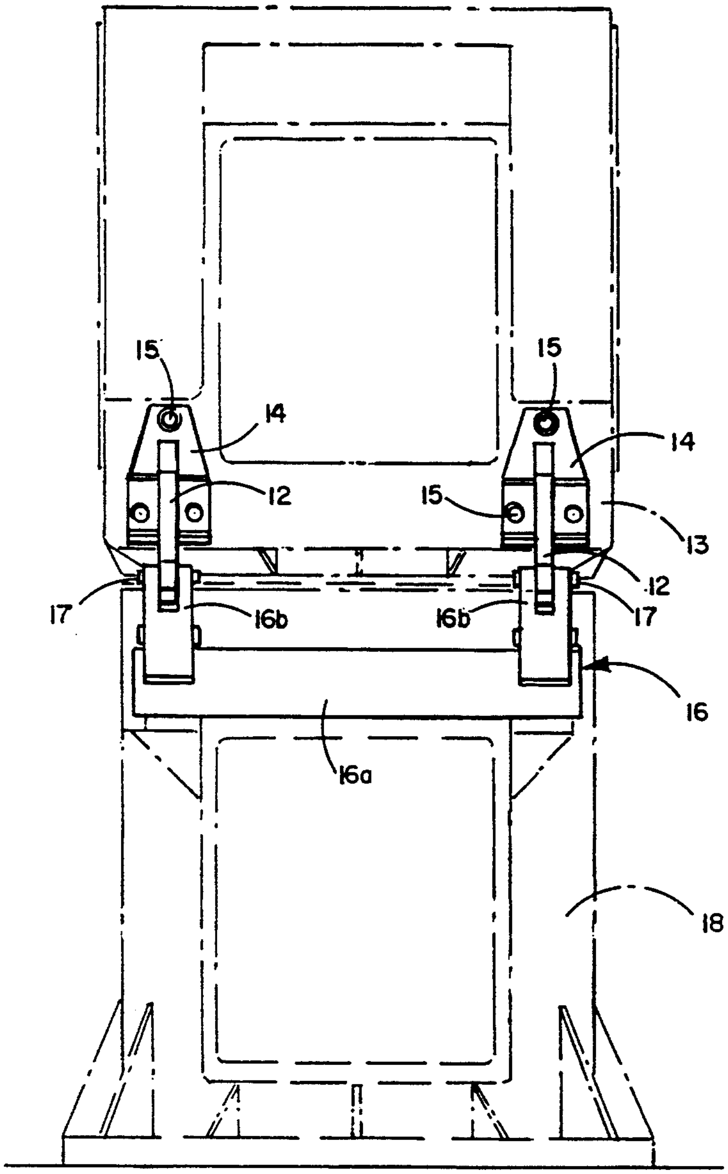
FIG. 4 is an end elevational view illustrating the preferred embodiment of the method and apparatus of the invention.

Referring to the drawings, a pair of backing plates 14 having upper clevis hinges 12 attached thereto are mounted on elevation housing 13 by means of bolts 15. Support hinge 16 has a cross bar **16*a* and two arms 16*b* which extend upwardly from each end of the bar. Apertures are formed in each of arms 16*b* which mate with apertures in each of clevis hinges 12, a pivotal connection being provided between the clevis hinges and the arms by clevis pins 17 which are installed in the apertures and held therein by suitable means such as cotter pins. Cross bar 16*a* has a backing plate 27 attached to both ends thereof, the backing plate being attached to azimuth housing 18 by means of bolts 28**.

Backing plate 19 which has upper jack clevis 20 attached thereto is attached to elevation housing 13 by means of bolts 25. The free end of arm **30*a* of jack 30 has an aperture therein which mates with an aperture in clevis 20. A pivotal joint is formed between arm 30*a* and clevis 20 by means of clevis pin 31** which is installed through these apertures and retained in place by means of a cotter pin.

Lower jack clevis 37 is attached to backing plate 38 which is in turn attached to attached to azimuth housing 18 by means of bolts 39. Jack 30 is a conventional machine screw jack which may be driven by a worm gear such as the 5 ton Actionjac commercially available from Nook Industries, located in Cleveland, Ohio.

The azimuth bearing inner race mounting bolts (not shown) are now removed from inside of the elevation housing. All components passing between the elevation and azimuth housings are also removed.

The jack handwheel **30*c* is now rotated to lift the elevation housing pivotally off the azimuth housing as shown in FIG. 1**. Typically the tilt angle to which the antenna housing is lifted is about 30 degrees.

Winch 40 is now pivotally mounted on cross arm **16*a* for lateral pivotal motion by means of pin member 42, the pin member being retained in place by means of cotter pins. Winch 40 has a support arm 40*a* and a pulley drive formed by pulley wheels 40*b*, around which support cable 40*c* is installed, the cable being driven by means of crank arm 40*d*. Attached to the end of cable 40*c* is a bearing adapter 47**.

Figure 3:
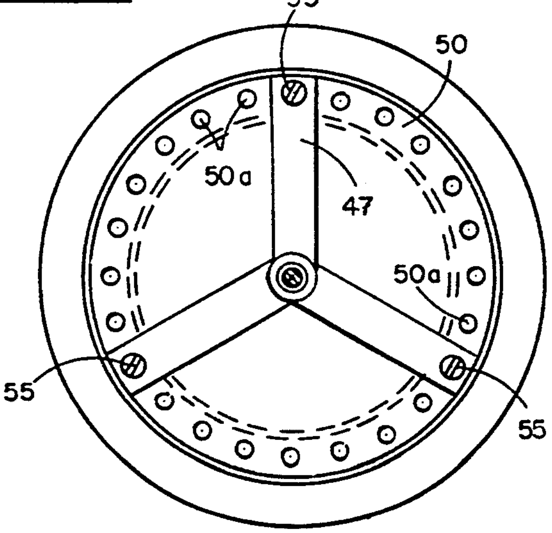
FIG. 3 is a top plan view illustrating how the bearing is lifted out in the preferred embodiment.

Bearing adapter 47 has three arms which extend outwardly, each of the arms having an aperture formed therethrough. As shown in FIG. 3, the bearing 50 to be removed has a plurality of threaded apertures **50*a* formed therearound. When bearing adapter 47 is lowered down onto the bearing by means of crank arm 40*d*, the apertures in bearing adapter 47 can be aligned with three of apertures 50*a*. A threaded bolt 55 is then inserted through each of adapter apertures and threadably engaged with corresponding ones of apertures 50*a***. The winch can then be used to lift the bearing out of the housing and pivotally rotated away from such housing. The bearing can then be lowered from the antenna by means of the winch.

In installing a new bearing, the above procedure is merely reversed.

The method and apparatus of the invention thus facilitates the removal and replacement of antenna bearings in installations which are difficult to access.

While the invention has been described and illustrated in detail, it is to be clearly understood that this is intended by way of illustration and example only and is not to be taken by way of limitation, the spirit and scope of the invention being limited only by the terms of the following claims.

I claim:

1. A method for removing an antenna bearing from an antenna pedestal on which an antenna is mounted, said pedestal having elevation and azimuth bearing housings for containing said bearing, said method comprising the steps of:

installing a support hinge between the elevation and azimuth housings of the pedestal on one side thereof;

installing a jack between the elevation and azimuth housings of the pedestal on the side opposite to said one side thereof;

operating said jack to pivotally raise said elevation housing away from said azimuth housing, thereby exposing said bearing contained within said azimuth housing;

installing a winch on the support hinge, said winch having a bearing adapter suspended therefrom for attachment to said bearing;

operating said winch to lower said adapter onto said bearing and attaching said bearing to said adapter; and operating said winch to lift said bearing out of said azimuth housing and to lower said bearing to a position below said antenna.

2. The method of claim 1 wherein said jack is operated to raise the elevation housing to a tilt angle of approximately 30 degrees.

3. The method of claim 1 wherein said winch is mounted for transverse pivotal motion on said support hinge, the bearing adapter being positioned directly above the bearing prior to the lowering thereof and positioned away from the azimuth housing after the bearing has been lifted out of the azimuth housing.

4. The method of claim 1 wherein said bearing adapter has a plurality of laterally extending arms, said bearing having threaded apertures formed therein, each of said arms having an aperture formed therethrough, said adapter being attached to said bearing by means of bolts which are fitted through said arm apertures and threadably engaged with said bearing apertures.

5. Apparatus for use in removing a bearing from an antenna pedestal with an antenna mounted thereon, said pedestal having azimuth and elevation bearing housings, said apparatus comprising:

a support hinge, said hinge being mounted between the elevation housing and the azimuth housing on one side thereof to permit longitudinal pivotal motion between said housings;

a jack, said jack being mounted between the elevation housing and the azimuth housing on the side opposite to said one side thereof;

a winch mounted on the support hinge;

bearing adapter supported by said winch; and means for removably attaching said bearing adapter to said bearing;

whereby said jack is operated to raise said elevation housing to a tilt angle on said support hinge and said winch is then operated to lift said bearing out of said azimuth housing and lower it below said azimuth housing.

6. The apparatus of claim 5 wherein said winch is pivotally mounted on said support hinge.

7. The apparatus of claim 5 wherein said bearing adapter has a plurality of arms, each with an aperture formed therethrough, said bearing having a plurality of threaded apertures formed therein, said means for attaching said adapter to said bearing comprising threaded bolts which are fitted through the apertures in said adapter arms and threadably engage the threaded apertures of said bearing.

* * * * *